United States Patent [19]
Ko

[11] Patent Number: 5,431,605
[45] Date of Patent: Jul. 11, 1995

[54] SPEED REDUCER WHICH EMPLOYS ROLLING MEANS

[76] Inventor: Chung C. Ko, 56, Min Shen St., Fengyuan, Taichung, Taiwan

[21] Appl. No.: 159,288

[22] Filed: Nov. 30, 1993

[51] Int. Cl.$^6$ ............................................. F16H 1/28
[52] U.S. Cl. ..................................... 475/168; 475/178
[58] Field of Search ............................... 475/168, 178

[56] References Cited

U.S. PATENT DOCUMENTS

| | | | |
|---|---|---|---|
| Re. 17,811 | 9/1930 | Braren | 475/168 |
| 4,471,672 | 9/1984 | Butterfield et al. | 475/168 |
| 5,188,572 | 2/1993 | Yamaguchi et al. | 475/178 |

FOREIGN PATENT DOCUMENTS

| | | | |
|---|---|---|---|
| 377435 | 6/1923 | Germany | 475/168 |
| 617074 | 8/1935 | Germany | 475/168 |

Primary Examiner—Dirk Wright

[57] ABSTRACT

A speed reducer employing rolling means comprises a casing, a high speed shaft connecting to an eccentric rod which has a variety of hollow pinion rollers disposed thereon. A plurality of slow speed shaft pins revolvably disposed in the pinion rollers respectively have one end opposite from the high speed shaft to connect to a slow speed shaft. A gear roller keeping ring is mounted on the pinion rollers for confining the pinion rollers thereto. A plurality of ring gear pins respectively enveloped with a ring gear roller for being rotatably engaged with the hollow pinion rollers, have their both ends connecting to the internal surface of the casing. Rotation of the eccentric rod drives revolution of the pinion rollers about the ring gear pins to actuate the slow speed shaft pins to revolve in the pinion rollers to achieve the speed reduction.

2 Claims, 4 Drawing Sheets

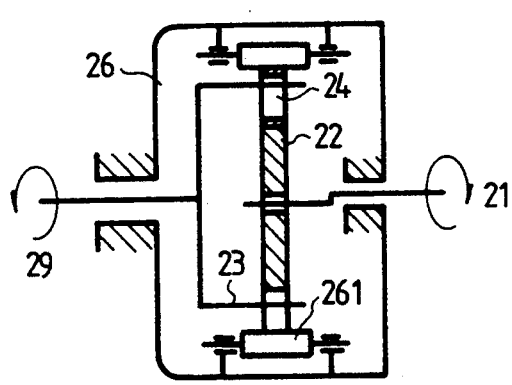
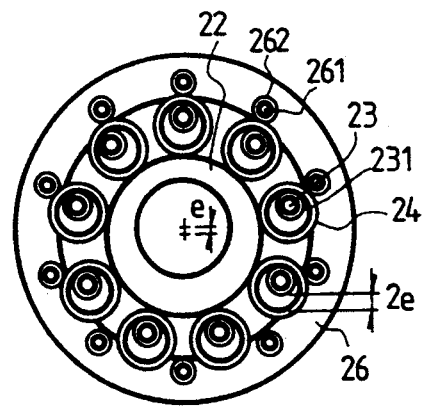
FIG. 4B                FIG. 4A
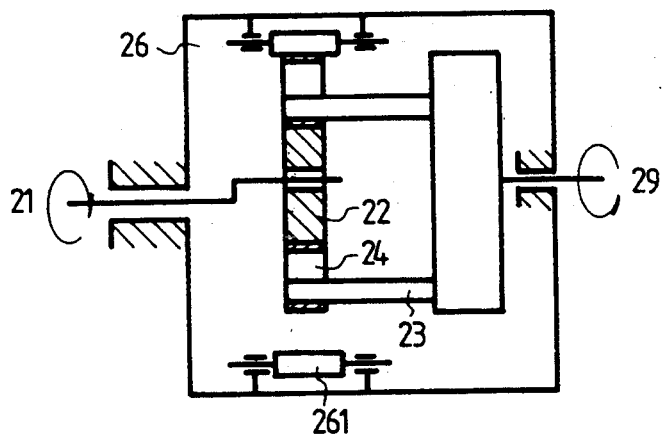
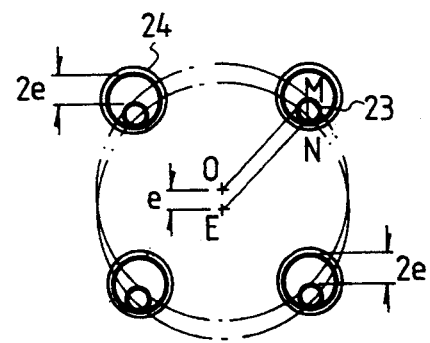
FIG. 5B                FIG. 5A

SPEED REDUCER WHICH EMPLOYS ROLLING MEANS

BACKGROUND OF THE INVENTION

This invention relates to a speed reducer, more particularly, to a speed reducer which employs a variety of rolling means. Accordingly, conventional speed reducers which employs the differential gear transmission, such as planetary gear speed reducer, cyclo drive speed reducer and gear pin drive speed reducer, are generally distinguished from their transmission means which are respectively planetary gear 2, cycloid disc 4 and sliding gear pin 8. (See FIGS. 1 to 3)

Referring to FIGS. 1A and B, a planetary gear speed reducer includes a planetary gear 2 which is driven by a crank shaft 3 and restricted within an internal gear 1. In accordance with the transmission principle of the planetary gear, the angular velocity is $W2/W1 = -1/P$. The P is the remainder given by subtracting the teeth of the planetary gear 2 from the teeth of the internal gear 1. The highest ratio of the speed reduction may be obtained by the counter-rotation of the planetary gear 2. However, the tooth interference may be caused by the limit of gear profile on isolute between the planetary gear 2 and the internal gear 1. Additionally, the cost of the planetary gear speed reducer is raised by its complicate manufacturing process.

FIGS. 2A and B show a cyclo drive speed reducer including a cycloid disc 4 driven by an eccentric rod 7 and restricted by a plurality of ring gear pins 5. In accordance with the principle of the differential gear transmission, the cycloid disc 4 revolves around the ring gear pins 5 and rotates on the eccentric rod 7. Since the ring gear pins 5 are smoothly circular in shape and the cycloid disc 4 rotates in a cycloidal oscillation, the contact between the cycloid disc 4 and the ring gear pins 5 therefore reduces to improve the differential gear mechanism which gear difference may be ranged from one to four teeth. However, the manufacturing cost is raised due to the complicated structure of the cyclo drive speed reducer.

FIGS. 3A and B show a gear pin drive speed reducer comprising a plurality of sliding gear pins 8 which are driven by an eccentric rod 7, engaged with a plurality of ring gear pins 5 and restricted within a slow speed shaft disc 10. The slow speed shaft disc 10 directly causes the speed reduction. The disadvantages of the gear pin drive speed reducer are enumerated hereinafter. First, when the slow speed shaft disc 10 braked by the sliding gear pins 8 while in their rotation suddenly, due to the centrifugal force and the gravity, the sliding gear pins 8 may easily disengage from the slow speed shaft disc 10 to cause the jamming of the operation. Even though the disengagement of the sliding gear pins 8 from the slow speed shaft disc 10 does not occur, the gear pin drive speed reducer will make a loud noise by its violent shaking because of the unstable rotating speed of the sliding gear pins 8. Furthermore, the temperature of the gear pin speed reducer apparently rises during its long-time operation.

SUMMARY OF THE INVENTION

This invention is a speed reducer which mainly comprises a plurality of hollow pinion rollers mounted on and confined to an eccentric rod by a gear roller keeping ring, on which a plurality of ring gear pins enclosed with a respective ring gear roller are removably disposed. Each of the pinion rollers has a slow speed shaft pin respectively encircled with a slow speed shaft roller rotatably disposed therein. Rotation of the pinion rollers driven by the eccentric rod drives the pinion rollers to revolve about the ring gear rollers. This invention has a first objective to provide a fine and simple construction that improves the efficiency of a speed reducer and reduces its manufacturing cost. Apart from the better performance of transmission, this invention has another objective to provide a speed reducer that improves its wear-resistance.

This invention has advantages and characteristics described hereinafter.

A. Small in Volume, High Speed Ratio

The speed reducer employing rolling means has a high speed ratio generated by its pinion rollers which is only arranged in a single train. Conpared to conventional speed reducers which have the same performance and speed ratio as this invention does, the volume of the speed reducer employing rolling means is generally ranged from one third to five sixth of the volume of conventional ones.

B. More Engaged Teeth Improving Its Load Capacity

Double trains arrangement of this invention achieves the engaged teeth in any time approximately 50%. The load capacity of the speed reducer employing rolling means is approximately 5 to 6 times as that of conventional ones, respectively.

C. Less Damage, High Efficiency

Due to the pinion rollers smoothly rotates and revolves about the ring gear rollers which envelops ring gear pins, such a rolling manner causes little damage in component parts to have a higher efficiency in the transmission of a speed reducer.

D. Slow Speed Shaft in Simple Construction

The slow speed shaft connecting to the slow speed shaft pins which simple structure simplifies the manufacturing process, saves the assembling manpower, shortens the manufacturing time and reduces the manufacturing cost as compared to the structure of conventional ones.

E. Simple Manual Assembly

The pinion rollers and the ring gear rollers are either small parts of simple shape or uniform assembly of standard rolling members. This arrangement saves labor in smoothing out jagged edges of the gear teeth or peculiar maintenance. Since the pinion rollers smoothly rotate and revolve about the ring gear rollers, the eccentric rod does not need to to be installed with two drum axles. This again reduces the manufacturing cost. According to the analysis on test production, the manufacturing cost of the speed reducer is 20 to 30% off that of conventional ones.

F. Stable Rotation and Revolution Reducing the Noise

Compared to conventional speed reducers the pinion rollers in this invention have more gears respectively engaged with the ring gear rollers to stablize its rotation and revolution. The noise is therefore largely reduced.

The invention is hereinafter described with reference to the accompanying drawing in which:

FIG. 4A is a partially enlarged view of the transmission mechanism of the present invention;

FIG. 4B is a schematic diagram showing the layout of the present invention;

FIG. 5A is a schematic diagram showing the pinion rollers rotating at equal speed;

FIG. 5B is a schematic diagram similar to FIG. 4B.

DETAILED DESCRIPTION OF THE PREFERRED EMBODIMENT

Figure 1B:
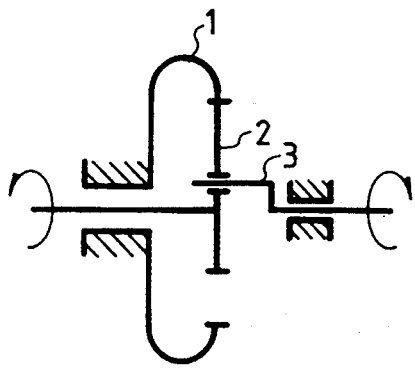
FIG. 1B is a schematic diagram showing the layout of the planetary gear speed reducer.
Figure 1A:
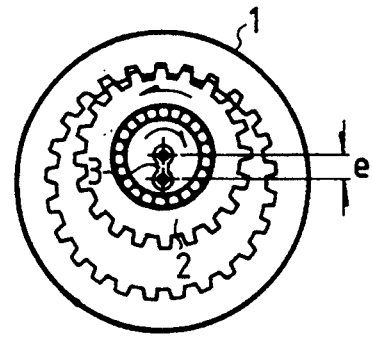
FIG. 1A is a partially enlarged view of the transmission mechanism a planetary gear speed reducer.
Figure 2B:
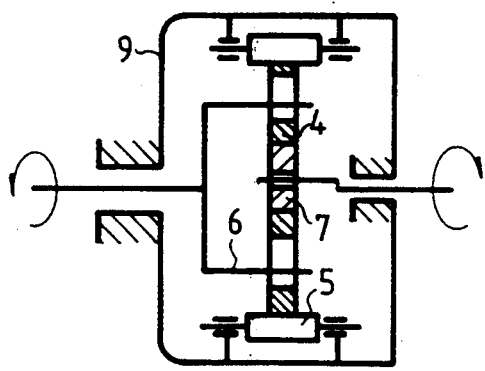
FIG. 2B is a schematic diagram showing the layout of the cyclo drive speed reducer.
Figure 2A:
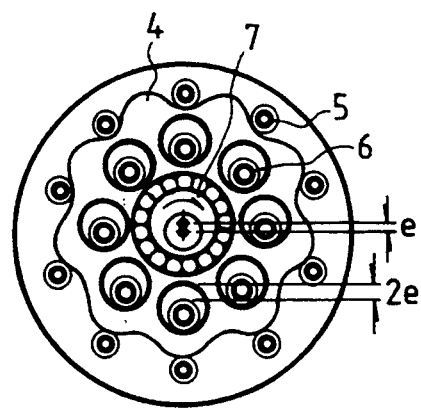
FIG. 2A is a partially enlarged view of the transmission mechanism of a cyclo drive speed reducer.
Figure 3B:
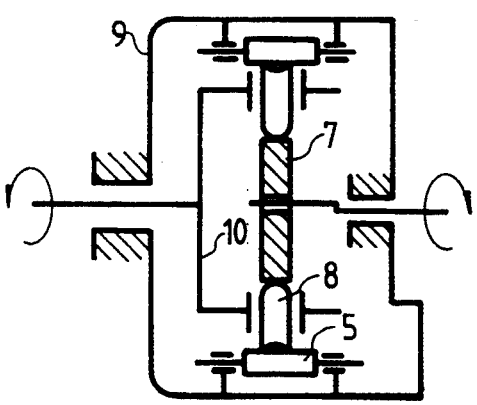
FIG. 3B is a schematic diagram showing the layout of the gear pin drive speed reducer.
Figure 3A:
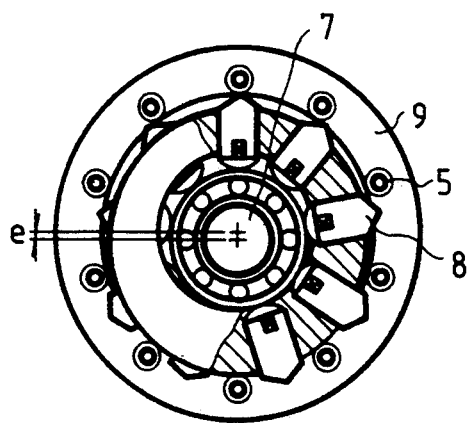
FIG. 3A is a partially enlarged view of the transmission mechanism of a gear pin drive speed reducer.
Figure 6:
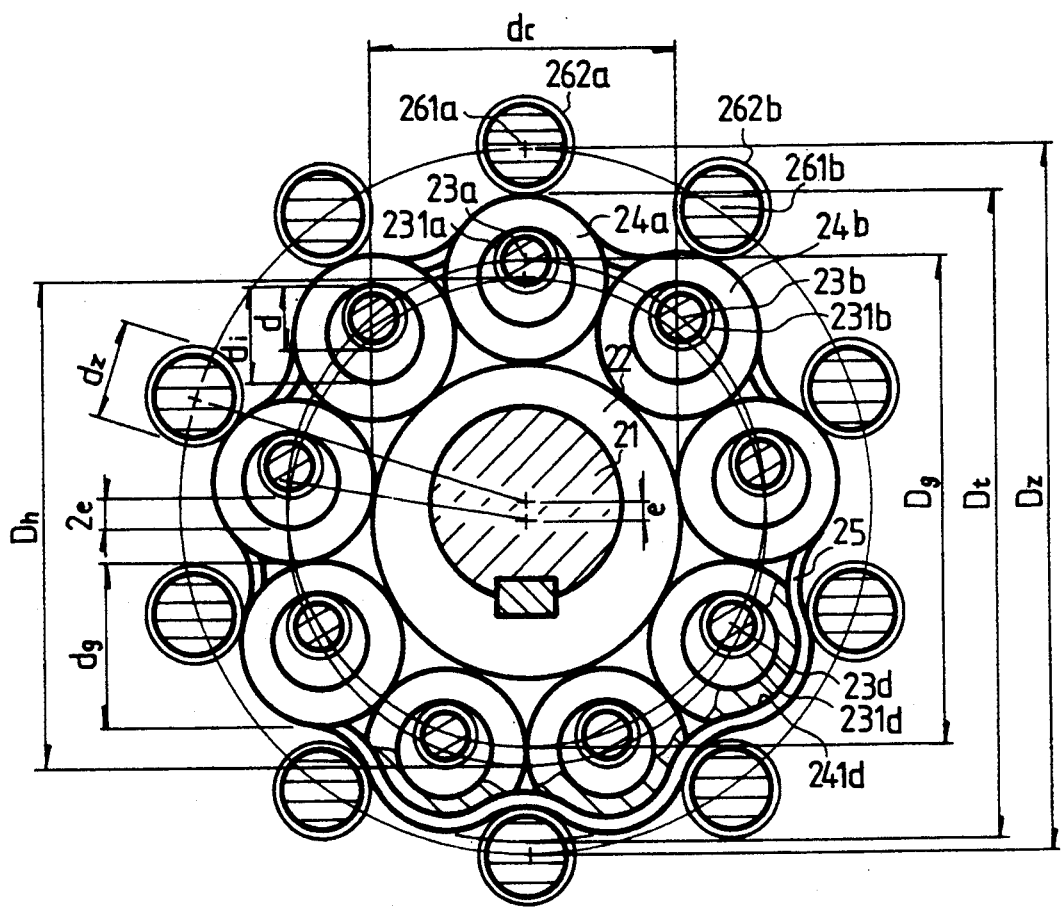
FIG. 6 is a cross-sectional view showing the layout of the transmission mechanism of the present invention.

FIGS. 4 and 5 show a speed reducer employing rolling means 20. The speed reducer employing rolling means 20 generally comprises a high speed shaft 21 having one end penetrating through a casing 26 and connecting to a transmission mechanism which is secured to a slow speed shaft 28 extending opposite from the high speed shaft 21 to penetrate the casing 26. Referring to FIG. 6, the transmission mechanism includes an eccentric rod 22, a plurality of slow speed shaft pins 23 respectively enclosed with a slow speed shaft roller 231, a plurality of hollow pinion rollers 24, a gear roller keeping ring 25, a plurality of ring gear pins 261 respectively encircled with a ring gear roller 262.

Referring to FIGS. 4 and 5, the end of the high speed shaft 21 which is connected with the transmission mechanism is the eccentric rod 22. The high speed shaft 21 and the eccentric rod 22 define an exciting wave sourcer. The hollow pinion rollers 24, which are disposed on the outer circumference of the eccentric rod 22, respectively have a slow speed shaft pin 23 enclosed with a slow speed shaft roller 231 disposed therein. The slow speed shaft pins 23 have one end which extends in a direction opposite from the high speed shaft 21 connecting to one end of the slow speed shaft 28. The slow speed shaft 28 has the other end penetrating through the casing 26 opposed to the portion of the casing 26 which has the high speed shaft 21.

Figure 7:
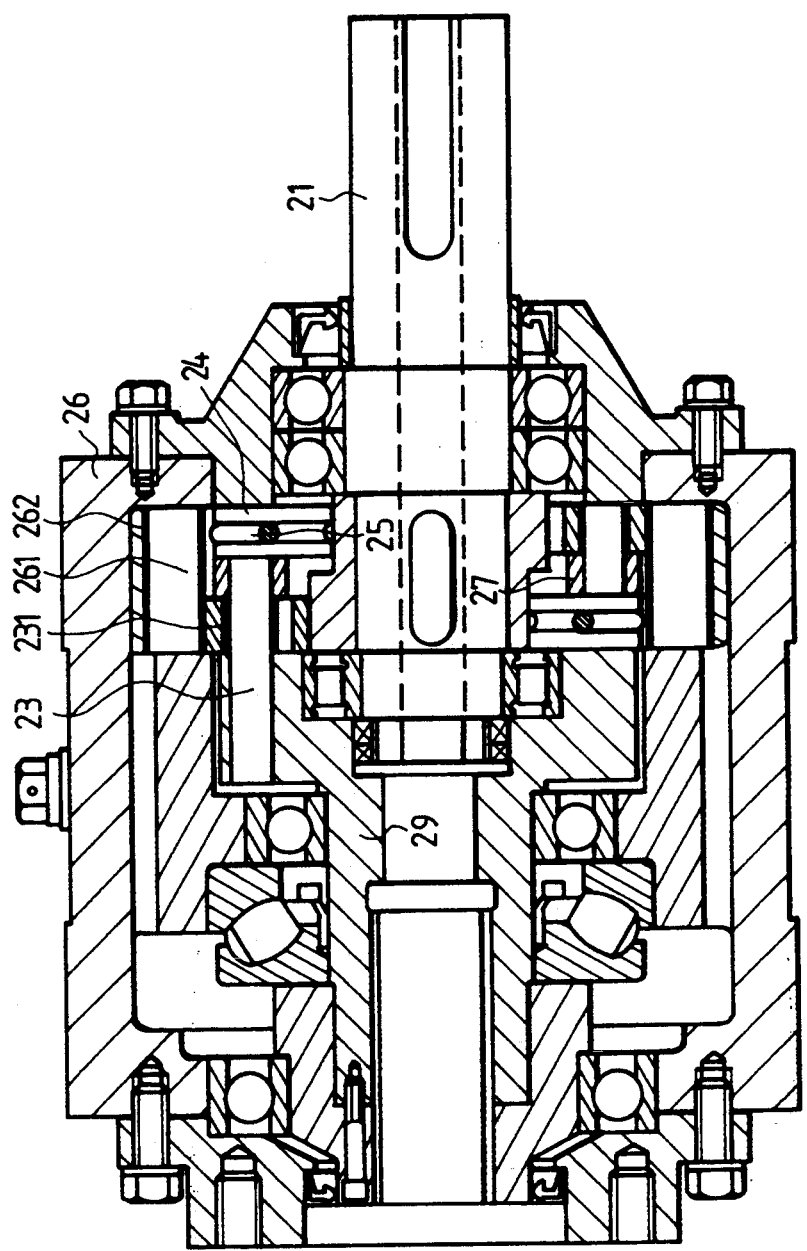
FIG. 7 is a cross-sectional view showing the transmission mechanism installed in the present invention.

Referring to FIGS. 6 and 7, the gear roller keeping ring 25 is disposed on the outer circumferences of the hollow pinion rollers 24. The gear roller keeping ring 25 confines the pinion rollers 24 to the outer circumference of the eccentric rod 22. The ring gear pins 261 are respectively enclosed with the ring gear rollers 262 which are rotatably engaged with the pinion rollers 24. Referring to FIGS. 4B and 5B, each of the ring gear pins 261 has its both ends is fixedly secured to the internal surface of the casing 26.

Referring to FIGS. 4 and 5, the exciting wave sourcer drives the pinion rollers 24 to revolve around the ring gear rollers 262 in a conjugated cycloid oscillation and rotate themselves. The friction caused by the revolution of the pinion rollers 24 around the ring gear rollers 262 thus reduces the rotation speed of the pinion rollers 24. The rotation and the revolution of the pinion rollers 24 directly drives the slow speed shaft pins 23 with their respective slow speed shaft rollers 231 to respectively revolve around the inner circumferences of the pinion rollers 24. FIG. 5A shows OE, the distance between the two centers of the high speed shaft 21 and the eccentric rod 22, is equal and parallel to MN, the distance between the two centers of the pinion roller 24 and the slow speed shaft pin 23. Connecting OEMN forms a parallelogram, the angular velocity of the slow speed shaft 28 is therefore always equal to that of the pinion roller 24.

Referring to FIG. 4, according to the transmission principle of the speed reducer employing rolling means, the exciting wave sourcer periodically drives the pinion rollers 24 to engage with the ring gear rollers 262 to actuate the transmission to generate a regularly relative movements among three principal components such as the eccentric rod 22, the pinion rollers 24 and the ring gear rollers 262. Fix any one of these three principal components in position, the remainder develop into a main and subordinate relationship to obtain a permanent speed increasing/reducing ratio. If any two of these three principal components are selected, let one be main actuating means, the remainder is therefore given the differential speed transmission. During the transmission of the speed reducer employing rolling means 20, let the rotation speed of the ring gear rollers 262, the eccentric rod 22 and the pinion rollers 24 respectively be N262, N22 and N24, and their tooth number respectively be T262, T22 and T24. In accordance with the principle of the relative movements, the speed reduction ratio of the speed reducer employing rolling means 20 is expressed as the following equation:

$$R^{24}_{22,262} = \frac{N22 - N24}{N262 - N24} = \frac{T262}{T262 - T24} = \frac{T262}{Tp} = \frac{T262}{a}$$

Tp is the remainder which is given by subtracting the teeth of the pinion rollers 24 from the teeth of the ring gear roller 262. a represents RPM (revolution per minute) of the eccentric rod 22.

When any one of the three principal components are holden in position, the speed ratio can be obtained as the following table.

| Transmission Manner | Speed Ratio | | Rotation Direction | Application |
|---|---|---|---|---|
| Fix pinion roller (N24 = 0) | $\frac{24}{22\text{-}262}\text{-}262$ | $R_{22,262} = \frac{T262}{T262\text{-}T24}$ | T262 > T24 same direction<br>T262 < T24 opposite direction | High Speed Reduction Ratio in Transmission |
| | $\frac{24}{262\text{-}22}$ | $R_{262,22} = \frac{T262\text{-}T24}{T262}$ | T262 > T24 same direction<br>T262 < T24 opposite direction | High Speed Reduction Ratio in Transmission General Use |
| Fix ring gear roller (N262 = 0) | $\frac{262}{22\text{-}24}$ | $R_{22,24} = \frac{-T24}{T262\text{-}T24}$ | T262 > T24 opposite direction<br>T262 < T24 same direction | High Speed Reduction Ratio in Transmission |

| Transmission Manner | Speed Ratio | | Rotation Direction | Application |
|---|---|---|---|---|
| | $\dfrac{262}{24-22}$ | $R_{24,22} = \dfrac{T262-T24}{-T24}$ | T262 > T24 opposite direction<br>T262 < T24 same direction | High Speed Reduction Ratio in Transmission Less Use |
| Fix exciting wave sourcer ($N22 = 0$) | $\dfrac{22}{262-24}$ | $R_{262,24} = \dfrac{T24}{T262}$ | Same Direction | Low Speed Increase & Reduction Ratio |
| | $\dfrac{22}{24-262}$ | $R_{24,262} = \dfrac{T262}{T24}$ | Same Direction | Even Lower Speed Ratio in Increase & Reduction |

Let $N262=0$, $a=\pm 1$ (the rotation of the eccentric rod 22, $a=\pm 1$), and substitute for their respective signs in the above equation, the speed ratio of the speed reducer employing rolling means 20 is expressed hereunder.

$$R_{22,24} = \frac{-T24}{T262 - T24} = \frac{-T24}{a} = \pm T24$$

($+$ means same direction, $-$ means opposite direction)

For equally receiving the force of reaction acting thereupon, the eccentric rod 22 and the pinion rollers 24 can be arranged in double row. The two eccentric rods 22 are symmetrically installed in an angle of 180 degrees corresponding to each other. Since the number of the pinion rollers 24 is usually odd, a spacer ring 27 is therefore provided for the connection of the slow speed shaft pins 23 when in double row. The ring gear pins 261 enclosed with the ring gear rollers 262 remain in single row, are lengthened for being disposed on and engaged with the pinion rollers 24 when in double row. Double trains or multiple trains of the pinion rollers 24 can be provided and linked to obtain a higher speed ratio of the transmission.

Referring to FIG. 6, the basic parameters and the dimensions are illustrated as the following table.

| No. | NAME | Code | EQUATION |
|---|---|---|---|
| 1. | Speed Ratio | R | |
| 2. | Distance between Two Centers of Two Farest Ring Gear pins | Dz | |
| 3. | Tooth Number of Pinion Rollers | T24 | $T24 = R$ |
| 4. | Tooth Number of the Ring Gear Pins | T262 | $T262 = T24 + 1$ |
| 5. | Distance between Two Centers of High Speed Shaft and Eccentric Rod | e | $e = K1 \dfrac{Dz}{2T24}$ |
| 6. | Diameter of Pinion Roller | dz | $dz = \dfrac{Dz}{K2} \sin \dfrac{\pi}{T262}$ |
| 7. | Diameter of Slow Speed Shaft Roller | dg | $dg = Dz \sin \dfrac{\pi}{T24}$ (allowance considered) |
| 8. | Internal Diameter of Pinion Roller | di | $di = d + 2e$ (d is the diameter of slow shaft roller) |
| 9. | Distance between Two Centers of Two Farest Pinion Rollers | Dh | $Dh = dc + dg = Dg$ (dc is the diameter of eccentric rod) |
| 10. | Distance between Two Farest Points on Outer Circumferences of Two Farest Pinion Rollers | Dt | $Dt = Dz - dz + 2e$ |

K1 is a short cycloid coefficient usually restricted from 0.4 to 0.7. However, the best performance occures when K1 is restricted within an even more stricker range between 0.5 and 0.6. When K1 is over 0.7, the strength of contact and the friction increase. When K1 is below 0.4, the force of reaction on the contact points apparently increases.

K2 is a diameter coefficient of the ring gear pins 261. Hereunder is a table which suggests the parameters available.

| R | <11 | 12~23 | 24~35 | 36~59 | 60~87 |
|---|---|---|---|---|---|
| K2 | 3.85~2.85 | 2.8~2 | 2~1.15 | 1.5~1 | 1.5~0.99 |

This invention is so arranged and applied for mainly satisfying the demands of the transmission relationship and the precision, and the demand of its strength is deemed as a secondary objective.

Further modification of the invention herein described will occur to persons skilled in the art and all such modifications are deemed to be within the scope of the invention as defined by the appended claims.

I claim:

1. A speed reducer comprising a casing, a high speed shaft having one end extending to penetrate through said casing and connect to an eccentric rod for defining an exciting wave sourcer, a plurality of hollow pinion rollers disposed on the outside surface of said eccentric rod, a plurality of slow speed shaft pins respectively encircled with a slow speed shaft roller which are revolvably disposed in said pinion rollers and have one end extending in a direction opposite from said high speed shaft to connect to a slow speed shaft extending to penetrate through said casing, a gear roller keeping ring mounted on the outer circumferences of said hollow pinion rollers for confining said hollow pinion rollers to the outside surface of said eccentric rod, a plurality of ring gear pins being enveloped with a ring gear roller and having two ends is fixedly secured to the internal surface of said casing, respectively; said ring gear rollers being retatably engaged with said hollow pinion rollers;

rotation of said exciting wave sourcer driving the revolution of said hollow pinion rollers about said ring gear rollers in a conjugated cycloid oscillation to actuate said slow speed shaft rollers to respectively revolve around the inner circumferences of said hollow pinion rollers, whereby the speed reduction being achieved.

2. A speed reducer as claimed in claim 1, wherein said eccentric rod and said hollow pinion rollers being alternatively arranged in double row, a spacer ring being provided for the connection of said slow speed shaft pins, said eccentric rods being symmetrically arranged in an angle of 180 degrees corresponding to each other, while said ring gear pins enclosed with said ring gear rollers remaining in single row, are lengthened for being disposed on and engaged with said hollow pinion rollers.

* * * * *